United States Patent
Schöllhorn

[11] Patent Number: 5,266,861
[45] Date of Patent: Nov. 30, 1993

[54] TERMINAL STUD IN THE ROTOR OF AN ELECTRIC MACHINE

[75] Inventor: Karl Schöllhorn, Birr, Switzerland

[73] Assignee: Asea Brown Boveri Ltd., Baden, Switzerland

[21] Appl. No.: 925,668

[22] Filed: Aug. 7, 1992

[30] Foreign Application Priority Data

Oct. 1, 1991 [CH] Switzerland ............... 2902/91

[51] Int. Cl.$^5$ ............... H02K 1/22; H02K 15/00
[52] U.S. Cl. ............... 310/261; 310/42
[58] Field of Search ............... 310/71, 42, 261, 55, 310/60 A, 65, 52

[56] References Cited

U.S. PATENT DOCUMENTS 3,457,440  7/1969  Horsley .

FOREIGN PATENT DOCUMENTS 586966  4/1977  Switzerland .
775109  5/1957  United Kingdom .

OTHER PUBLICATIONS

International Search Report, Mar. 13, 1992 (3 pages).

*Primary Examiner*—Steven L. Stephan
*Assistant Examiner*—E. To
*Attorney, Agent, or Firm*—Oblon, Spivak, McClelland, Maier & Neustadt

[57] ABSTRACT

In large electric machines, the electrical connection between the exciter supply lead (5, 6), which extends axially in the center of the rotor, and the exciter winding conductors in the winding overhang of the rotor is highly stressed electrically and mechanically. If the terminal stud (1) is slotted in the shank (2) in the longitudinal direction of the stud, there being provided at least three slots (13) which extend radially up to the longitudinal axis of the stud, the stud becomes more elastic transversely to the longitudinal direction, and it can be purposively cooled.

15 Claims, 1 Drawing Sheet

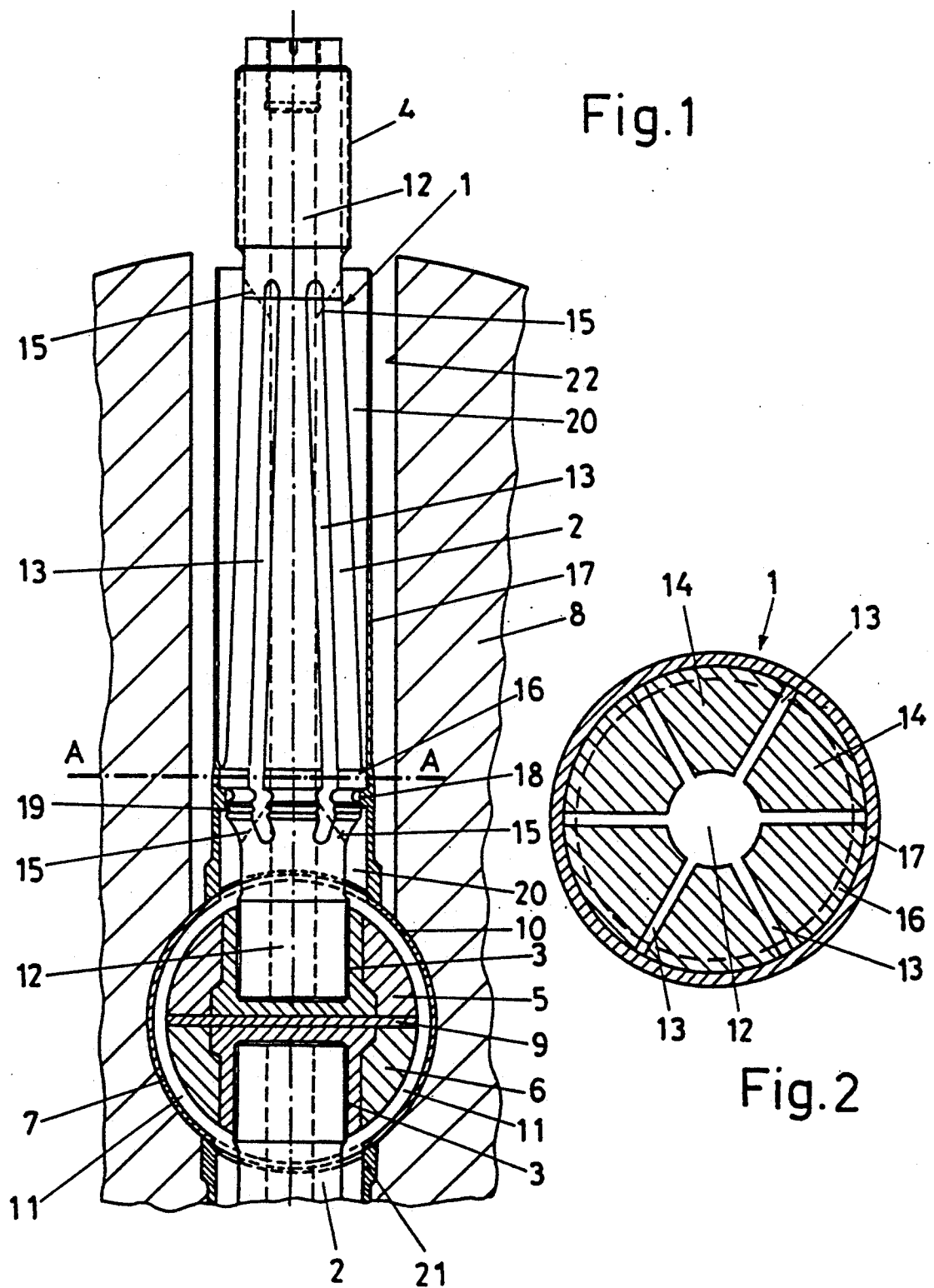

TERMINAL STUD IN THE ROTOR OF AN ELECTRIC MACHINE

BACKGROUND OF THE INVENTION

1. Field of the Invention

The invention relates to a terminal stud in the rotor of an electric machine, in particular a turbo-generator, for connecting the exciter supply lead, which extends axially in the center of the rotor, to the exciter winding conductors in the winding overhang of the rotor, which stud is produced from steel and consists of a shank and threads on both stud ends.

The invention refers in this connection to the prior art which emerges, for example, from Swiss Patent 586,966.

2. Discussion of Background

In turbo-generators, the guidance of the exciter leads on the rotor to the rotor winding is generally performed in a central shaft bore-hole. The conductors in the shaft bore-hole are mostly solid and insulated all around. The connection from these centrally guided solid conductors to the rotor winding is produced via terminal studs screwed radially into the solid conductors. Such a stud is the subject matter of Swiss Patent 586,966, for example. In addition to studs of copper or a copper alloy, use has been made in more recent designs of studs made from high-strength steel, which must then be forcibly cooled. Common to all designs is that, in addition to the screwed connection with the solid conductors in the shaft bore-hole, at least one second screwed joint of the stud in the radial shaft bore-hole is regarded as indispensable in order to counter the centrifugal forces acting on the stud.

The second screwed joint is now located in a shaft section which is extremely highly stressed as a consequence of the shaft deflection due to the dead weight of the rotor and to unbalance forces. In the most unfavorable case, it is possible for cracks which can lead to damage to form in the region of the thread in the radial shaft bore-hole.

SUMMARY OF THE INVENTION

It is the object of the invention to provide a terminal stud which entails no risk for the shaft and can also be optimally cooled.

This object is achieved according to the invention when the shank is slotted in the longitudinal direction of the stud and at least three slots are provided which extend radially up to the center of the stud.

The advantage of the invention is to be seen in particular in that the stud is elastic transverse to the longitudinal direction of the stud without appreciable loss of strength in the longitudinal direction. The slotting in the longitudinal direction furthermore enables optimum cooling. The stud according to the invention is also lighter by comparison with known designs, so that there is no need for additional retention by a screwed joint, etc. Cooling can be further intensified when, in accordance with a first development, the stud is provided with a through bore-hole penetrating the entire stud.

It is furthermore advantageous to construct the shank conically, the thicker end being at the internal stud end. This reduces the loading due to centrifugal force.

A further intensification of cooling can be achieved when there is pushed over the stud a thin-walled hollow cylinder which is supported by an inwardly projecting projection on a collar on the stud at the level of the transition from the thread to the shank, and cooling gas is purposively led through the space between the stud shank and said cylinder. In conjunction with the slots reaching to below said collar, cooling can be perfected such that the stud withstands all operational stresses from the electrical and mechanical points of view.

Exemplary embodiments of the invention are explained in more detail below together with the advantages achievable thereby with reference to the drawing.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 1 shows a longitudinal section of an exemplary embodiment of a terminal stud according to the invention installed in the machine; and FIG. 2 shows a section through the terminal stud according to FIG. 1 along the line AA therein.

DESCRIPTION OF THE PREFERRED EMBODIMENTS

Referring now to the drawings, wherein like reference numerals designate identical or corresponding parts throughout the several views, a terminal stud made from steel and designated overall by the reference numeral 1 has a conical shank 2 and threads 3, 4 on both ends. At the internal end, the stud 1 is screwed into solid conductors 5, 6, having a semicircular cross section, which extend axially in a central shaft bore-hole 7 of the rotor body 8. An insulating layer 9 made from glass fiber reinforced plastic is provided between the two flat sides of the solid conductors 5, 6 for the purpose of mutual insulation. The central shaft bore-hole 7 is lined with an insulating tube 10 which has openings in the region of the stud 1. An annular space 11 through which cooling gas can flow is provided between the insulating tube 10 and the solid conductors 5, 6.

As can be seen from the stud cross section represented in FIG. 2, the stud shank is provided with a through bore-hole 12 in the longitudinal direction of the stud. In addition, the stud shank 2 is provided in the longitudinal direction of the stud with, in the case of example, six slots 13 which can be recognized as sectors 14 in FIG. 2. In this connection, a slot is understood to be a material cutout which extends essentially in the longitudinal direction of the stud and in a limiting case extends up to the longitudinal axis of the stud. Said slots 13 reach in the longitudinal direction of the stud up to near the thread 3, 4 and terminate there (dotted lines in 15 in FIG. 1). The radial extent of the slots 13 is to be dimensioned such that the latter intersect the through bore-hole 12. It is also possible to introduce a number of slots 13 other than six, three to be seen as the lower limit, while the upper limit is determined by the remaining residual strength.

A collar 16 is constructed on the stud shank at the transition from the shank 2 to the (internal) thread 3. A thin-walled hollow cylinder 17 is pushed (starting from the internal end) over the stud 1 before the stud 1 is screwed in. The latter has, near its internal end, an annular projection 18 which is inwardly directed and by means of which the hollow cylinder 17 is supported on said collar 16. A safety ring 19 serves to hold the stud 1 and hollow cylinder 17 together. As emerges clearly from FIG. 1, the slots 13 reach to behind the collar 16 before they terminate in the stud section between the collar 16 and the internal thread 3. In this way, the annular space 11 between the solid conductors 5, 6 and the insulating tube 10 are freely connected via the opening in the insulating tube 10 to the annular space 20 between the radially external shank section and the hollow cylinder 17. Cooling gas conveyed by the machine fan can flow, without appreciable impairment of the annular space 11, in the shaft bore-hole 7 through the slots 13 in the stud shank and, finally, through the annular space 20, before it once again leaves the rotor.

In order that as little cooling gas as possible flows outside the hollow cylinder 17 between the latter and the wall of the radial shaft bore-hole 22, the lower end of the hollow cylinder 21 is thickened and matched to the shape of the insulating tube 10. In addition, the position of the annular projection 18 is dimensioned such that the lower end 21 of the hollow cylinder 17 rests on the insulating tube 10 in the installed state.

In addition to the purposive guidance of cooling gas in and on the stud, the slots 13 have a second essential function: the terminal stud according to the invention is substantially more elastic in the transverse direction without appreciable reduction in the strength of the stud in its longitudinal direction. The result of this is to achieve decoupling between the clamping point of the stud on the solid conductors 5, 6 in the shaft bore-hole 7, on the one hand, and the terminal on the rotor winding overhang, which substantially increases the operational reliability of the machine.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A terminal stud in a rotor of an electric machine, in particular a turbo-generator, for connecting an exciter supply lead, which extends axially in a center of the rotor, to exciter winding conductors in a winding overhang of the rotor, which stud is produced from steel and comprises a shank and threads on both stud ends, wherein the shank is slotted in a longitudinal direction of the stud and at least three slots are provided.

2. The terminal stud as claimed in claim 1, wherein the stud is provided with a through bore-hole extending through the entire stud.

3. The terminal stud as claimed in claim 1 or 2, wherein the shank is constructed conically, with a thicker end portion disposed radially inwardly with respect to a thinner portion when said stud is mounted.

4. The terminal stud as claimed in one of claims 1 or 2, wherein there is pushed over the stud a thin-walled hollow cylinder which is supported by an inwardly projecting projection on a collar on the stud at the level of a transition from the thread to the shank.

5. The terminal stud as claimed in claim 4, wherein the slots in the stud penetrate said collar.

6. The terminal stud as claimed in claim 3, wherein there is pushed over the stud a thin-walled hollow cylinder which is supported by an inwardly projecting projection on a collar on the stud at the level of a transition from the thread to the shank.

7. The terminal stud as claimed in claim 6, wherein the slots in the stud penetrate said collar.

8. The stud as claimed in claim 2, wherein the slots extend radially from said through bore-hole to an outer periphery of said shank.

9. A terminal stud for a rotor of an electric machine comprising:
   a shank disposed between a pair of ends of said stud, said shank extending along a longitudinal direction of the stud;
   a plurality of longitudinal slots provided in said shank said slots each extending in radial and longitudinal directions along said shank.

10. The stud of claim 9, wherein said stud includes a bore-hole extending through a center of said stud and communicating with said plurality of longitudinal slots whereby said bore-hole and said plurality of slots provide cooling passages for a cooling gas.

11. The terminal stud of claim 9 or claim 10, wherein said stud is elastic in a direction transverse to said longitudinal direction.

12. The terminal stud of claim 9, wherein said shank has a conical peripheral surface which is interrupted by said plurality of longitudinal slots.

13. The terminal stud of claim 9, wherein each of said pair of ends is threaded.

14. A terminal stud comprising:
   a shank disposed between a pair of ends of said stud;
   a plurality of slots extending along a longitudinal direction of said shank; and
   wherein said shank has an outer periphery having a shape corresponding to a section of a cone, and wherein said plurality of slots are disposed in said outer periphery.

15. The terminal stud of claims 1 or 9, wherein said shank includes an outer peripheral surface, and wherein said slots extend through said outer peripheral surface along a substantial portion of said shank.

* * * * *